US010797447B2

(12) United States Patent
Roudier et al.

(10) Patent No.: US 10,797,447 B2
(45) Date of Patent: Oct. 6, 2020

(54) ELECTRICAL CONNECTION DEVICE WITH BUILT-IN LOCKOUT FUNCTION

(71) Applicants: RENAULT s.a.s., Boulogne-Billancourt (FR); NISSAN Motor Co., Ltd., Yokohama-shi (JP)

(72) Inventors: Sebastien Roudier, Massy (FR); Sylvain Bonnard, Rouen (FR); Igor Jovet, Arpajon (FR)

(73) Assignees: RENAULT s.a.s., Boulogne-Billancourt (FR); NISSAN Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 16/476,470

(22) PCT Filed: Jan. 16, 2018

(86) PCT No.: PCT/FR2018/050091
§ 371 (c)(1),
(2) Date: Jul. 8, 2019

(87) PCT Pub. No.: WO2018/142039
PCT Pub. Date: Aug. 9, 2018

(65) Prior Publication Data
US 2019/0372278 A1    Dec. 5, 2019

(30) Foreign Application Priority Data

Jan. 31, 2017  (FR) ..................................... 17 50800

(51) Int. Cl.
*H01R 13/703*      (2006.01)
*B60L 53/16*       (2019.01)

(52) U.S. Cl.
CPC .......... *H01R 13/7031* (2013.01); *B60L 53/16* (2019.02); *H01R 2201/26* (2013.01)

(58) Field of Classification Search
CPC .. H01R 31/08; H01R 31/085; H01R 13/7031; H01R 2201/26; B60L 53/16
(Continued)

(56) References Cited

U.S. PATENT DOCUMENTS 3,035,242 A * 5/1962 Sloop ..................... G01R 11/04
                                                    439/508
3,288,958 A * 11/1966 Walther ............... H01R 13/533
                                                    200/51.12
(Continued)

FOREIGN PATENT DOCUMENTS

EP         0 929 127 A1    7/1999

OTHER PUBLICATIONS

International Search Report dated Apr. 16, 2018 in PCT/FR2018/050091 filed Jan. 16, 2018.
(Continued)

*Primary Examiner* — Gary F Paumen
(74) *Attorney, Agent, or Firm* — Oblon, McClelland, Maier & Neustadt, L.L.P.

(57) ABSTRACT

An electronic device includes a male connector including at least two male pins, a female connector including at least two first terminals capable of being connected to a power source and at least two second terminals capable of being connected to at least one secondary power consumer. The male connector is capable of being connected to a primary power consumer. In parallel, each first terminal and each second terminal of the female connector is connected to a recess engaging, when the male connector is plugged into the female connector, with at least one male pin of the male connector so as to supply the primary consumer and the secondary consumer with electricity via the power source.

13 Claims, 3 Drawing Sheets

(58) Field of Classification Search
USPC .................................................. 439/507–515
See application file for complete search history.

(56) References Cited

U.S. PATENT DOCUMENTS

| | | | | |
|---|---|---|---|---|
| 3,917,371 | A * | 11/1975 | Hirokawa | H01R 29/00 |
| | | | | 439/52 |
| 6,123,553 | A | 9/2000 | Kobayashi et al. | |
| 6,780,027 | B2 * | 8/2004 | Allison | H01R 12/727 |
| | | | | 439/507 |
| 2009/0318002 | A1 * | 12/2009 | Murano | H01R 11/12 |
| | | | | 439/278 |
| 2012/0322298 | A1 * | 12/2012 | Aime | H01R 13/04 |
| | | | | 439/510 |
| 2013/0040502 | A1 | 2/2013 | Beak et al. | |
| 2015/0280182 | A1 | 10/2015 | Gibeau | |
| 2019/0372278 | A1 * | 12/2019 | Roudier | B60K 1/04 |

OTHER PUBLICATIONS

French Preliminary Search Report dated Oct. 12, 2017 in French Application 1750800 filed Jan. 31, 2017.

* cited by examiner

ELECTRICAL CONNECTION DEVICE WITH BUILT-IN LOCKOUT FUNCTION

BACKGROUND

The present invention relates to an electrical connection device for an electric vehicle or hybrid electric vehicle.

An electric vehicle or hybrid electric vehicle is generally provided with a lockout service that consists in breaking the electrical circuit so as to sever the electrical connection between the battery and systems that are supplied with power by said battery. In this case, the battery is isolated to ensure that it no longer supplies power to any system.

The operation of locking out the electric battery of the vehicle is performed by a connector that is dedicated to this function. This connector, which is often a "jumper" connector, is arranged between the battery and power consumers. It is thus possible to control the disconnection of these elements from one another by acting on this lockout connector.

However, the structure of this connector is often bulky, which makes it difficult to fit to the vehicle and results in additional installation costs. Moreover, the connector is sometimes fitted at locations that are difficult to access, which presents a problem for installation when replacing the connector in the event of malfunction.

Another type of lockout connector is disclosed for example in the document FR2988901. This document describes a double-pole electrical cut-off device allowing the two poles of the battery to be disconnected at the same time.

BRIEF SUMMARY

The objective of the invention is therefore to provide an electrical device allowing an energy source and at least one consumer to be disconnected from one another, the structure of said device not being overly bulky and said device not making the electrical circuit in which it is incorporated more complex.

To this end, the invention proposes an electrical connection device comprising
- a male connector including at least two male pins;
- a female connector including at least two first terminals that are capable of being connected to an energy source and at least two second terminals that are capable of being connected to at least one secondary power consumer.

According to the invention, the male connector is capable of being connected to a primary power consumer. Furthermore, each first terminal and each second terminal of the female connector is connected to a housing cooperating, when the male connector is plugged into the female connector, with at least one male pin of the male connector so as to supply the primary consumer and the secondary consumer with electricity from the energy source.

Thus, when the male connector is plugged into the female connector, the primary consumer and the secondary consumer are supplied with power simultaneously. However, when the male connector is unplugged from the female connector, the energy source is isolated from the rest of the electrical circuit. The electrical connection device according to the invention is then an effective electrical cut-off means allowing the battery of an electric vehicle to be isolated. Thus, no electric current flows between the battery and the consumers, in particular the electrical components of the motor.

Furthermore, the structure of this electrical connection device is simple and straightforward to incorporate within an electrical circuit. Specifically, all that is required is to connect the terminals of the female connector to the corresponding element: the energy source and the one or more connectors.

Moreover, this device provides an additional power supply interface in the electrical circuit. Thus, advantageously, the connection device of the invention provides a dual power-supply and lockout function in a single structure.

According to a first embodiment of the invention, each first terminal is inserted into a first housing and each second terminal is inserted into a second housing. Additionally, each first housing is parallel with the corresponding second housing.

According to the preceding paragraph, each male pin comprises a first branch and a second branch converging toward a common output. Each first branch and each second branch of the male pin are inserted, respectively, into the first housing and the second housing until contact is made with the first terminal and the second terminal when the male connector is plugged into the female connector.

According to one particular feature according to the first embodiment, the first housing and the second housing are produced in one piece.

According to a second embodiment, each first terminal is electrically connected to a first housing and each second terminal is electrically connected to a second housing. In particular, each first housing is aligned with the corresponding second housing so as to form a passage accepting a male pin.

According to the preceding paragraph, each first terminal comprises a first conductive lug. Similarly, each second terminal comprises a second conductive lug.

The invention also relates to an electrical architecture comprising a power energy source and at least one secondary consumer. According to the invention, this electrical architecture comprises an electrical connection device produced according to one of the features presented above. This electrical connection device is arranged between the energy source and the one or more secondary consumers.

The invention also relates to an electric vehicle or a hybrid electric vehicle including an electrical architecture presented above.

BRIEF DESCRIPTION OF THE DRAWINGS

Other innovative features and advantages will become apparent in the following description that is provided by way of completely nonlimiting indication and with reference to the appended drawings, in which.

DETAILED DESCRIPTION

Figure 1:
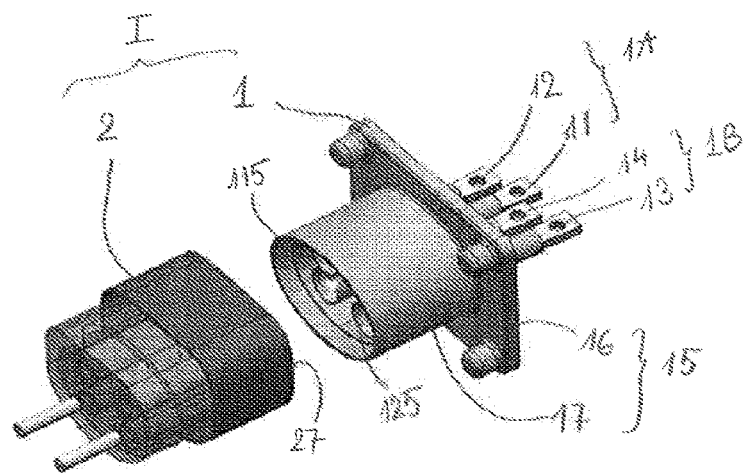
FIG. 1 shows an electrical connection device according to a first embodiment of the invention; said device comprising a female connector and a male connector.

With reference to FIG. 1, an electrical connection device I according to a first embodiment of the invention comprises a female connector 1 and a male connector 2.

The female connector 1 comprises a casing 15 including an attachment plate 16 and a skirt 17. The casing 15 covers electrical terminals 11, 12, 13 and 14 and intermediate connection pieces 115 and 125. The skirt 17 has a cross section that is complementary to that of a body 27 of the male connector 2. The latter is connected to a primary power consumer P.

Of course, the cross section of the skirt 17 and of the body 27 may be elliptical, triangular, square or take other suitable geometric shapes.

Figure 2:
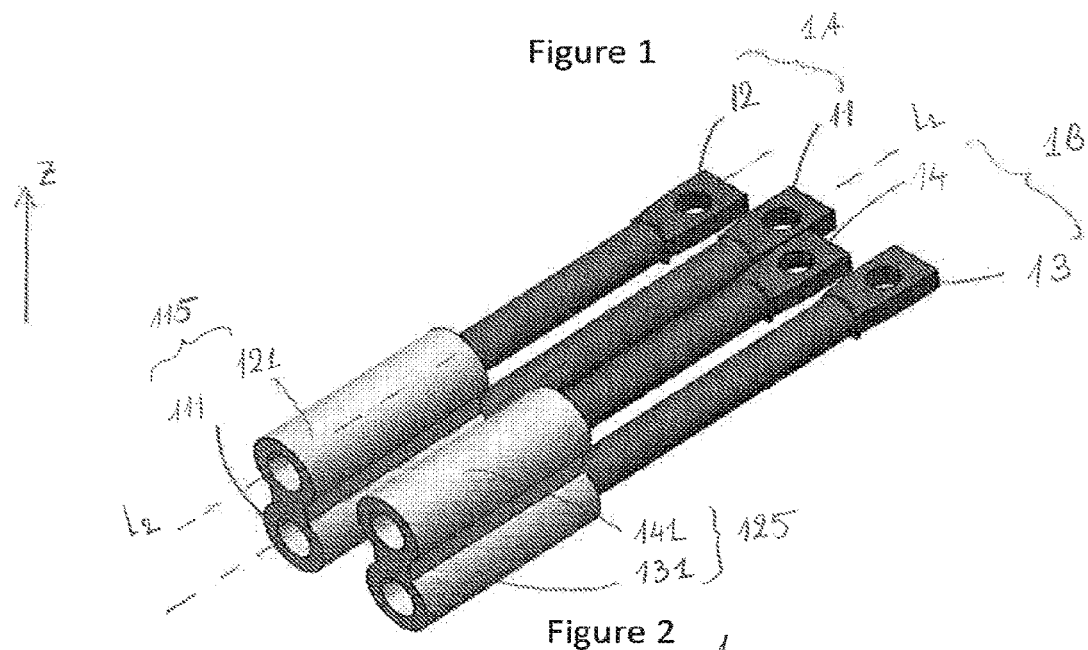
FIG. 2 shows the female connector of FIG. 1 without its outer casing.

In FIG. 2, only the electrical terminals 11, 12, 13 and 14 and the intermediate connection pieces 115 and 125 are illustrated. According to this embodiment, there are four electrical terminals that are paired off so as to form a first subassembly 1A and a second subassembly 1B. Each subassembly 1A or 1B consists of a first electrical terminal 11 or 13 and a second electrical terminal 12 and 14.

Given the symmetry of the female connector 1, the description of the first subassembly 1A applies equally for the second subassembly 1B. The first electrical terminal 11 is plugged into a first housing 111 while the second electrical terminal 12 is plugged into a second housing 121. The first 111 and second 121 housings are parallel with one another and vertically superposed, the direction of the Z axis-pointing upward in FIG. 2. Consequently, the first 11 and second 12 terminals, each being inserted into the corresponding housing, are arranged in parallel with one another and are located one above the other.

The first 11 and second 12 terminals and the first 111 and second 121 housings are complementary in shape, allowing them to be plugged in or unplugged axially, i.e. along the longitudinal axis $L_1$ and $L_2$ of each of these terminals. By way of example, the first 11 and second 12 terminals are cylindrical in shape and the first 111 and second 121 housings each include a cylindrical bore.

In this example, the first 111 and second 121 housings are produced in one piece, thus termed the first intermediate connection piece 115, to facilitate the formation of the subassemblies and the insertion of the male connector into each subassembly. For example, the intermediate connection piece 115 is made of an electrically insulating material.

Similarly, the first subassembly 1B of the female connector 1 consists of a first electrical terminal 13 that is inserted into a first housing 131 and of a second electrical terminal 14 that is inserted into a second housing 141. The first 131 and second 141 housings form part of a second intermediate connection piece 125.

Figure 3:
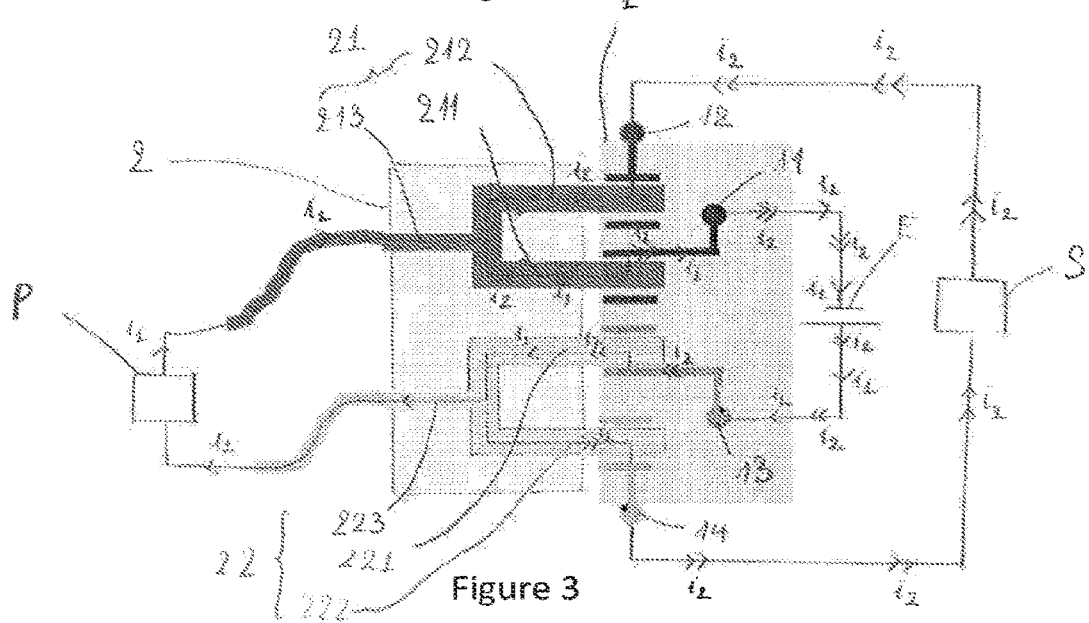
FIG. 3 shows a schematic diagram of the female connector of FIG. 1 cooperating with the corresponding male connector.

With reference to FIG. 3, the first terminals 11 and 13 are connected to an energy source E, in particular to a power battery of an electric vehicle, while the second terminals 121 and 122 are connected to a secondary consumer S. The second terminals 12 and 14 may be connected simultaneously to a plurality of secondary consumers. In this case, the secondary consumers are connected in parallel.

The male connector 2 cooperates with the female connector 1 so as to establish a supply of power not only to the primary consumer P from the energy source E but also to the secondary consumer S from the same energy source E. The male connector 2 comprises two male connection pins 21 and 22 that cooperate, respectively, with the first 1A and second 1B subassemblies of the female connector 1.

The first male connection pin 21 comprises a first branch 211 that is plugged into the first housing 111 and a second branch 212 that is plugged into the second housing 121. The first 211 and second 212 branches make contact, respectively, with the first terminal 11 and with the second terminal 12 to establish an electrical connection between these elements. Furthermore, these branches 211 and 212 converge toward a common output 213. Thus, the first pin 21 takes the shape of a fork.

The first pin 21, thus inserted into the first intermediate connection piece 115, establishes a first electrical connection between the energy source and the primary consumer on the one hand and between the energy source and the secondary consumer on the other hand.

Similarly, the second pin 22 comprises a first branch 221 that is inserted into the first housing 131 of the second intermediate connection piece 125 and a second branch that is inserted into the second housing 141 of the same piece. The first 221 and second 222 branches make contact with the corresponding terminals 13 and 14. The first 221 and second 222 branches converge toward a common output 223.

The second pin 22, cooperating with the second intermediate connection piece 125, establishes a second electrical connection between the energy source and the primary consumer on the one hand and between the energy source and the secondary consumer on the other hand.

Consequently, connecting the male connector 2 to the female connector 1 allows one electric current $i_1$ to flow between the two terminals of the primary consumer and another electric current $i_2$ to flow between the two terminals of the secondary consumer. In other words, the female connector 1, via the male connector 2, simultaneously supplies electricity to the primary consumer and to the secondary consumer. However, when the male connector 2 is disconnected from the female connector 1, no current flows between the consumers and the energy source. The energy source is thus isolated from the consumers, thereby ensuring an electrical cut-off between these elements. The energy source is thus locked out when the male connector 1 is disconnected.

Figure 4:
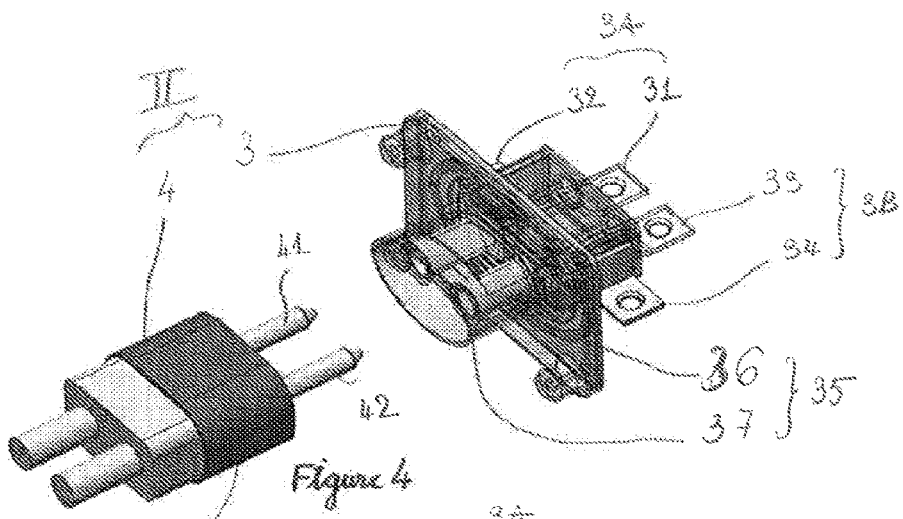
FIG. 4 shows an electrical connection device according to a second embodiment of the invention.

In FIG. 4, a connection device II according to a second embodiment of the invention comprises a female connector 3 and a male connector 4.

The female connector 3 comprises a casing 35 including an attachment plate 36 and a skirt 37. This skirt 37 has a cross section that is complementary to the cross section of a body 47 of a male connector 4. As in the first embodiment, the latter is connected to a primary power consumer P.

Of course, the cross section of the skirt 37 and of the body 47 may be elliptical, triangular, square or take other suitable geometric shapes.

Furthermore, the casing 35 covers electrical terminals 31, 32, 33 and 34. In the same way as in the first embodiment, the electrical terminals are arranged in pairs so as to form a first 3A and a second 3B subassemblies. Each subassembly 3A or 3B consists of a first terminal 31 or 33 and of a second terminal 32 or 34.

Figure 5:
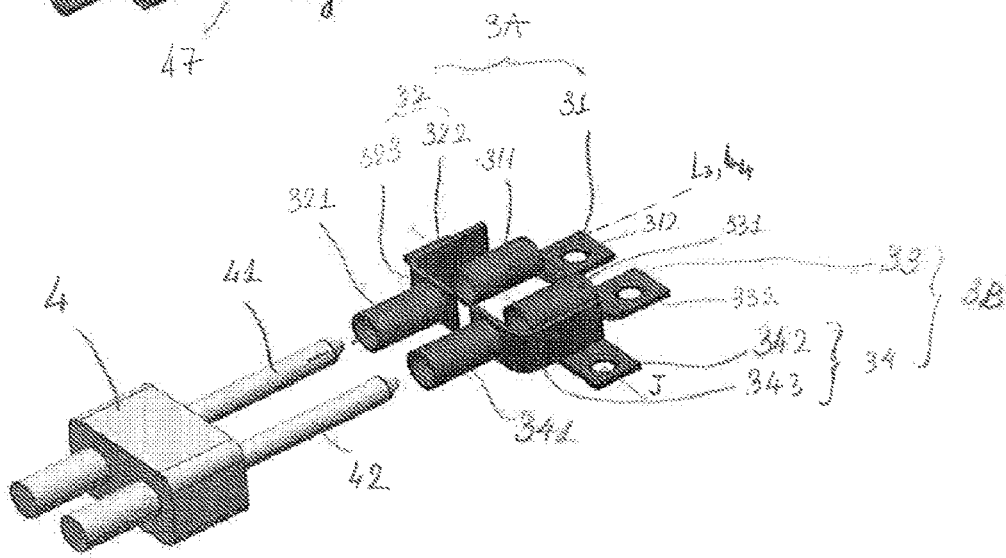
FIG. 5 shows the female connector and the male connector of FIG. 4 without their respective outer casings.

With reference to FIG. 5, the first 3A and second 3B subassemblies are identical to one another. As such, the description of one applies equally for the other.

With regard to the first subassembly 3A, the first terminal 31 comprises a first conductive lug 312 that is connected electrically, in particular by soldering, to a first housing 311.

In this example, the first housing 311 is a hollow cylindrical channel having a longitudinal axis $L_3$. The first conductive lug 312 is located in the axial continuation of said channel.

In the same way, the second terminal 32 comprises a second conductive lug 322 that is electrically connected to a second housing 321, the shape of which is identical to that of the first housing 311. This housing is also, in this example, a hollow cylindrical channel having a longitudinal axis $L_4$. Unlike the first terminal 31, the second conductive lug 322 is connected to the second housing via an L-shaped shim 323. The axis J of the second conductive lug is perpendicular to the axis $L_4$ of the second housing 312. Unlike the first embodiment described above, the first 311 and second 321 housings are placed in series, i.e. they are aligned with respect to one another such that their respective axes coincide. Furthermore, the first 311 and second 321 housings are spaced apart from one another.

In this way, a first passage 315 is formed so as to accept a first male pin 41, the shape of which is complementary to that of the passage. By way of example, the male pin is cylindrical and its diameter is substantially equal to the diameter of the first 311 and second 321 housings.

Similarly, the second subassembly 3B consists of a first terminal 33 and of a second terminal 34. Each of these terminals 33 or 34 comprises a conductive lug 332 or 342 that is connected electrically to a housing 331 or 341. The first housing 331 is arranged facing the second housing 341 to form a second passage 335. This second passage 335 accepts a second male pin 42 of the connector 4.

The male connector 4 is of the standard, inexpensive type that is easily sourced from suppliers.

In one example of the second embodiment, the terminals and their corresponding housing may be produced in one piece.

Figure 6:
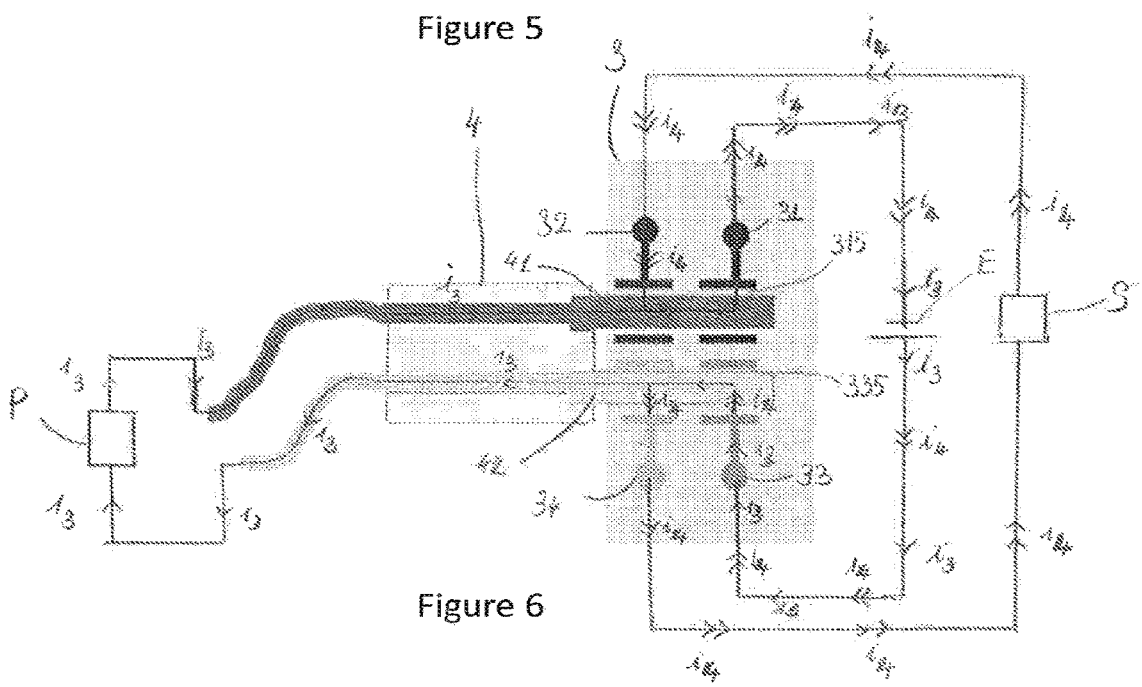
FIG. 6 shows a schematic diagram of the female connector of FIG. 4 cooperating with the corresponding male connector.

In FIG. 6, the first terminals 31 and 33 are connected to an electrical energy source E while the second terminals 32 and 34 are connected to a secondary consumer S.

The male connector 4 is plugged into the female connector 3. The first 41 and second 42 male pins are inserted, respectively, into the first 3A and second 3B subassemblies of the female connector 3. For each pair, inserting the male pin into the corresponding passage allows an electrical connection to be established between the energy source and the primary consumer on the one hand and between the energy source and the secondary consumer on the other hand.

Thus, this allows one electric current $i_3$ to flow between the two terminals of the primary consumer and another electric current $i_4$ to flow between the two terminals of the secondary consumer. These currents supply both the primary consumer and the secondary consumer with power. However, when the male connector 4 is unplugged from the female connector 3, there is no electrical connection between the energy source and the consumers. The electricity source is thus isolated or locked out.

Figure 7:
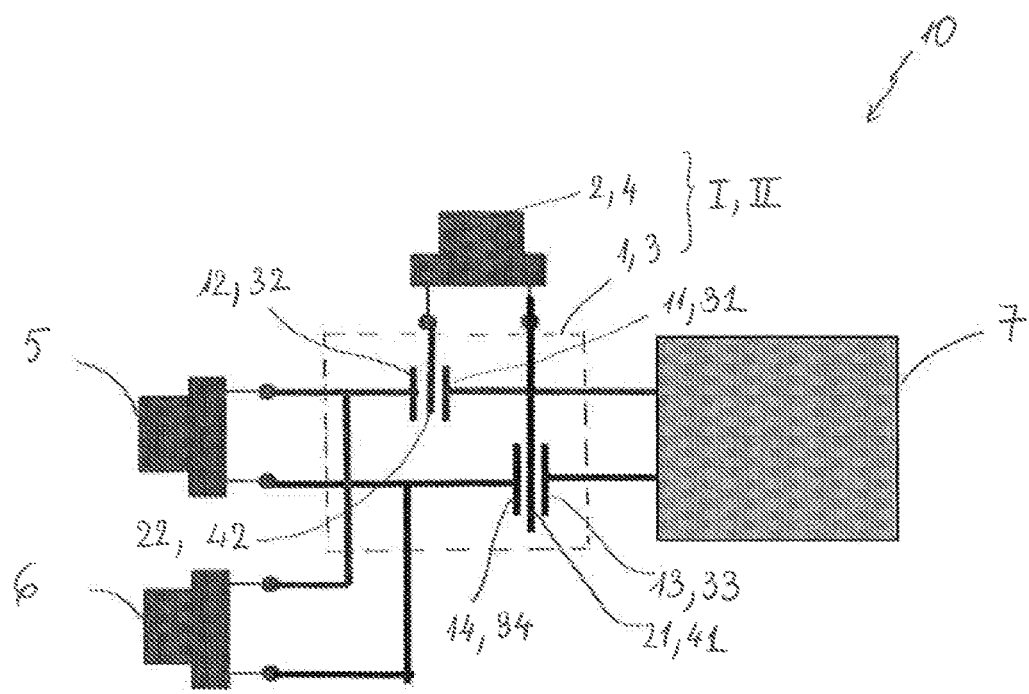
FIGS. 7 and 8 schematically show an electrical architecture comprising an electrical connection device according to the invention in the operating state and in the lockout state, respectively.
Figure 8:
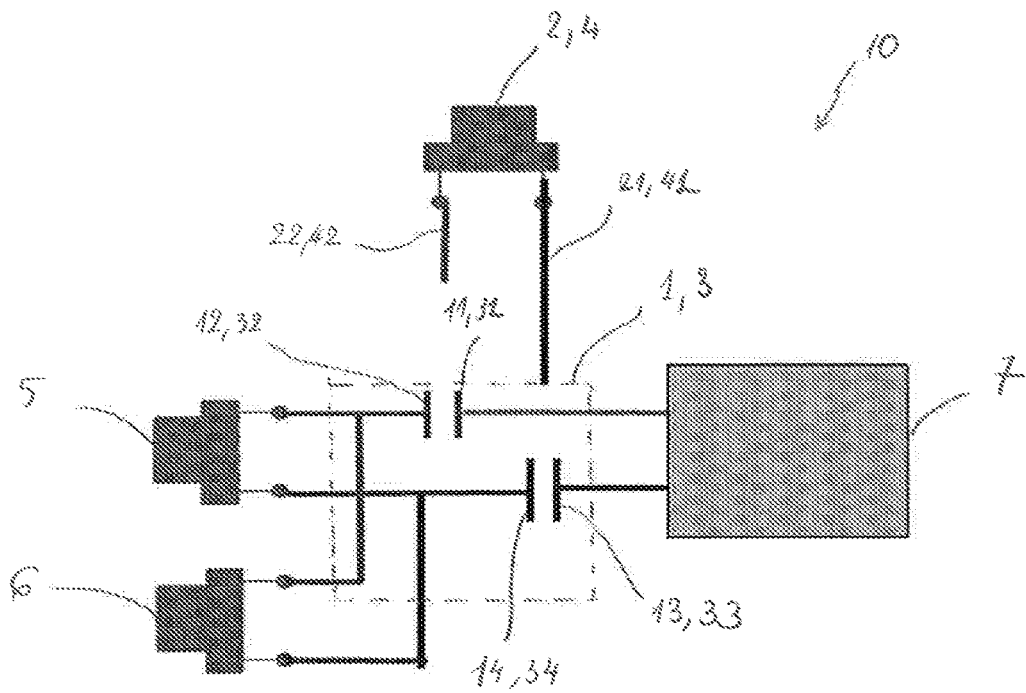

FIGS. 7 and 8 show one example of the electrical architecture 10 in which the connection device I or II such as described above is incorporated. The electrical architecture 10 comprises an energy source 7, two secondary connectors 5 and 6 and a female connector 1 or 3 for connecting a primary power consumer. The female connector is arranged between secondary connectors 5 and 6 and the energy source 10.

The first terminals 11, 13 or 31, 33 are connected to the energy source 10 while the second terminal 12, 14 or 32, 34 are connected to a plurality of secondary connectors 5, 6, which are connected in parallel in the electrical architecture 10.

In FIG. 7, the male connector 2 or 4 is plugged into the female connector 1 or 3 via its male pins 21, or 41, 42. The male connector is connected to a primary power consumer (not illustrated in FIGS. 7 and 8). The electrical architecture 10 is thus in the operating state in which the primary and secondary consumers are supplied with power. Conversely, when the male connector 2 or 4 is unplugged from the female connector 1 or 3 as shown in FIG. 8, the electrical circuits between the energy source 10 and the secondary consumers 5, 6 are interrupted. The same applies for the electrical circuit between the energy source 10 and the primary consumer. An electrical cut-off occurs within the electrical architecture 10, the energy source 7 being locked out.

The invention claimed is:

1. An electrical connection device, comprising:
a male connector including at least two male pins:
a female connector including at least two first terminals that are configured to be connected to an energy source and at least two second terminals that are configured to be connected to at least one secondary power consumer,
wherein the male connector is configured to be connected to a primary power consumer,
wherein each first terminal and each second terminal of the female connector is connected to a housing cooperating, when the male connector is plugged into the female connector, with at least one male pin of the male connector so as to supply the primary consumer and the secondary consumer with electricity from the energy source,
wherein each first terminal is inserted into a first housing and each second terminal is inserted into a second housing,
wherein each first housing is parallel with the corresponding second housing,
wherein each male pin comprises a first branch and a second branch converging toward a common output, and
wherein each first branch and each second branch of the male pin are inserted, respectively, into the first housing and the second housing until contact is made with the first terminal and the second terminal when the male connector is plugged into the female connector.

2. The electrical connection device as claimed in claim 1, wherein the first housing and the second housing are produced in one piece.

3. An electrical architecture, comprising:
a power energy source;
at least one secondary consumer; and
at least one of the electrical connection device as claimed in claim 1, said electrical connection device being arranged between the power energy source and the secondary consumer.

4. An electric vehicle or hybrid electric vehicle, comprising:
the electrical architecture as claimed in claim 3.

5. An electrical connection device, comprising:
a male connector including at least two male pins:
a female connector including at least two first terminals that are configured to be connected to an energy source and at least two second terminals that are configured to be connected to at least one secondary power consumer, wherein the male connector is configured to be connected to a primary power consumer, wherein each first terminal and each second terminal of the female connector is connected to a housing cooperating, when the male connector is plugged into the female connector, with at least one male pin of the male connector so as to supply the primary consumer and the secondary consumer with electricity from the energy source, wherein each first terminal is inserted into a first housing and each second terminal is inserted into a second housing, wherein each first housing is parallel with the corresponding second housing, wherein each first terminal is electrically connected to a first housing and each second terminal is electrically connected to a second housing, and wherein each first housing is aligned with the corresponding second housing so as to form a passage accepting a male pin.

6. The electrical connection device as claimed in claim 5, wherein
each first terminal comprises a first conductive lug, and
each second terminal comprises a second conductive lug.

7. An electrical architecture, comprising:
a power energy source;
at least one secondary consumer; and
at least one of the electrical connection device as claimed in claim 5, said electrical connection device being arranged between the power energy source and the secondary consumer.

8. An electric vehicle or hybrid electric vehicle, comprising:
the electrical architecture as claimed in claim 7.

9. The electrical connection device as claimed in claim 6, wherein each first housing is a hollow cylindrical channel having a first longitudinal axis and the first conductive lug is located in an axial continuation of the hollow cylindrical channel.

10. The electrical connection device as claimed in claim 6, wherein each second conductive lug is connected to the second housing via an L-shaped shim.

11. The electrical connection device as claimed in claim 6, wherein an axis of each second conductive lug is perpendicular to an axis of the second housing.

12. The electrical connection device as claimed in claim 6, wherein each first housing is a hollow cylindrical channel having a first longitudinal axis and the first conductive lug is located in an axial continuation of the hollow cylindrical channel, and wherein each second conductive lug is connected to the second housing via an L-shaped shim.

13. The electrical connection device as claimed in claim 6, wherein each first housing is a hollow cylindrical channel having a first longitudinal axis and the first conductive lug is located in an axial continuation of the hollow cylindrical channel, and wherein an axis of each second conductive lug is perpendicular to an axis of the second housing.

* * * * *